United States Patent [19]
Doi

[11] Patent Number: 4,985,799
[45] Date of Patent: Jan. 15, 1991

[54] DISK CARTRIDGE WITH IMPROVED DISK CLEANING

[75] Inventor: Hajime Doi, Ibaraki, Japan

[73] Assignee: Hitachi Maxell, Ltd., Osaka, Japan

[21] Appl. No.: 253,590

[22] Filed: Oct. 5, 1988

[30] Foreign Application Priority Data

Oct. 8, 1987 [JP] Japan .................................. 62-252354
Oct. 8, 1987 [JP] Japan .................................. 62-252355

[51] Int. Cl.$^5$ ............................................ G11B 23/033
[52] U.S. Cl. ...................................................... 360/133
[58] Field of Search ................ 360/133; 206/311, 312, 206/313, 444; 369/289, 290

[56] References Cited

U.S. PATENT DOCUMENTS

| | | | |
|---|---|---|---|
| 4,391,669 | 7/1983 | Yamakawa et al. | 360/133 X |
| 4,392,170 | 7/1983 | Okada | 360/133 |
| 4,655,348 | 4/1987 | Takagi | 360/133 X |
| 4,755,901 | 7/1988 | Fehrenbach et al. | 360/133 |
| 4,796,137 | 1/1989 | Gruehn et al. | 360/133 |
| 4,803,584 | 2/1989 | Doi et al. | 360/133 |

FOREIGN PATENT DOCUMENTS

| | | |
|---|---|---|
| 0041270 | 12/1981 | European Pat. Off. . |
| 0202660 | 11/1986 | European Pat. Off. . |
| 558151 | 2/1980 | Japan . |
| 0087285 | 5/1986 | Japan .................................. 206/313 |

Primary Examiner—David J. Severin
Attorney, Agent, or Firm—Birch, Stewart, Kolasch & Birch

[57] ABSTRACT

A disk cartridge which comprises a cartridge case receiving a magnetic disk and a cleaning sheet fixed by spot or line welding to the inner surfaces of the cartridge case such as to contact both sides of the magnetic disk; the density of the welding spots or lines is reduced or eliminated in the regions of the cleaning sheet which undergo the most pressure exerted by pressing pads on the recording/reproducing apparatus for the disk cartridge.

6 Claims, 10 Drawing Sheets

DISK CARTRIDGE WITH IMPROVED DISK CLEANING

BACKGROUND OF THE INVENTION

1. Field of the Invention

The present invention relates to a disk cartridge and, more particularly, to a disk cartridge having an improved construction for securing a cleaning sheet which is disposed on the inner side of the cartridge case.

2. Description of the Prior Art

Figure 9:
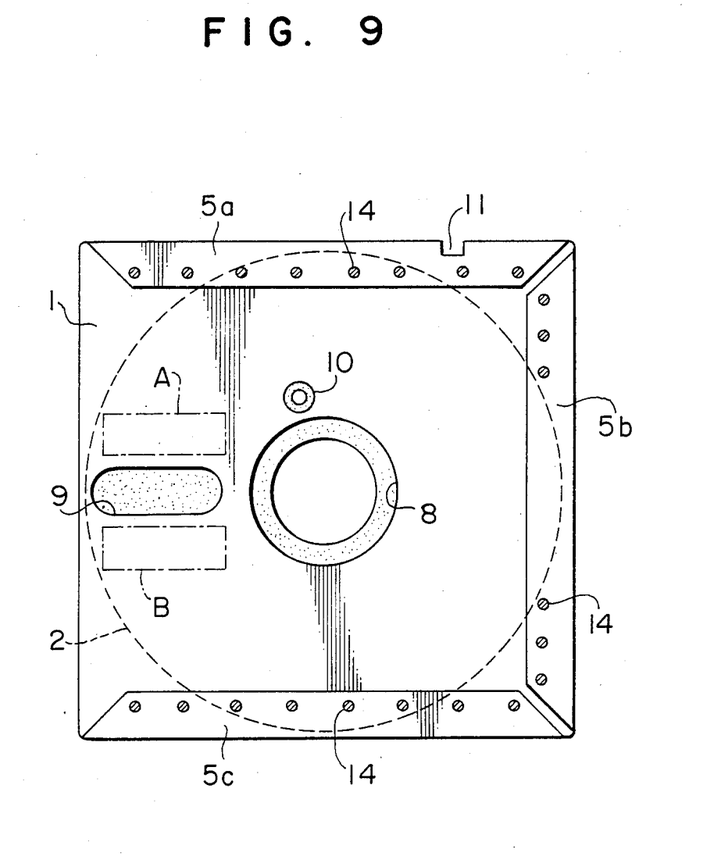
FIG. 9 is a bottom plan view of a conventional disk cartridge.

A known disk cartridge will be described with specific reference to FIGS. 9 and 10.

The disk cartridge has a cartridge case 1, a sheet-like flexible magnetic disk 2 rotatably disposed in the cartridge case 1, and a cleaning sheet 3 which is fixed to the inner surfaces of both panels of the cartridge case 1. The cleaning sheet 3 is made of, for example, a non-woven cloth of a fiber mixture composed of fibers of rayon and polypropylene, a fiber mixture composed of rayon and polyethylene terephthalate, fibers of polyethylene terephthalate alone, or the like. In manufacturing the disk cartridge, the cleaning sheet 3 is fixed to the inner surface of the cartridge case in a state developed as shown in FIG. 10 by being welded by means of, for example, ultrasonic wave.

Figure 11:
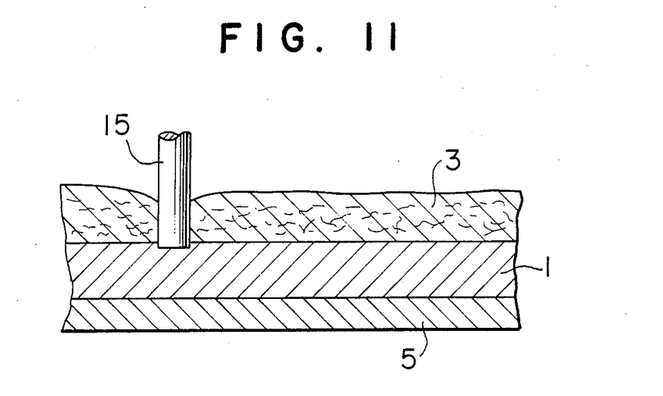
FIG. 11 is a sectional view of a cartridge case illustrating the conventional manner in which a cleaning sheet is attached to a cartridge case by ultrasonic spot welding.

FIG. 11 illustrates a method in which the cleaning sheet 3 is fixed to the inner surface of the cartridge case by being welded by means of, for example, ultrasonic wave. The cleaning sheet 3 to be fixed is laid on the inner surface of the cartridge case 1 while an electrode 5 is placed in contact with the other, i.e., outer surface, of the cartridge case 1. Then, a welding pin 15 is pressed into/against the cleaning sheet 3 towards the cartridge case 1 and ultrasonic energy is supplied so as to spot-weld the cleaning sheet 3 onto the cartridge case 1.

Figure 10:
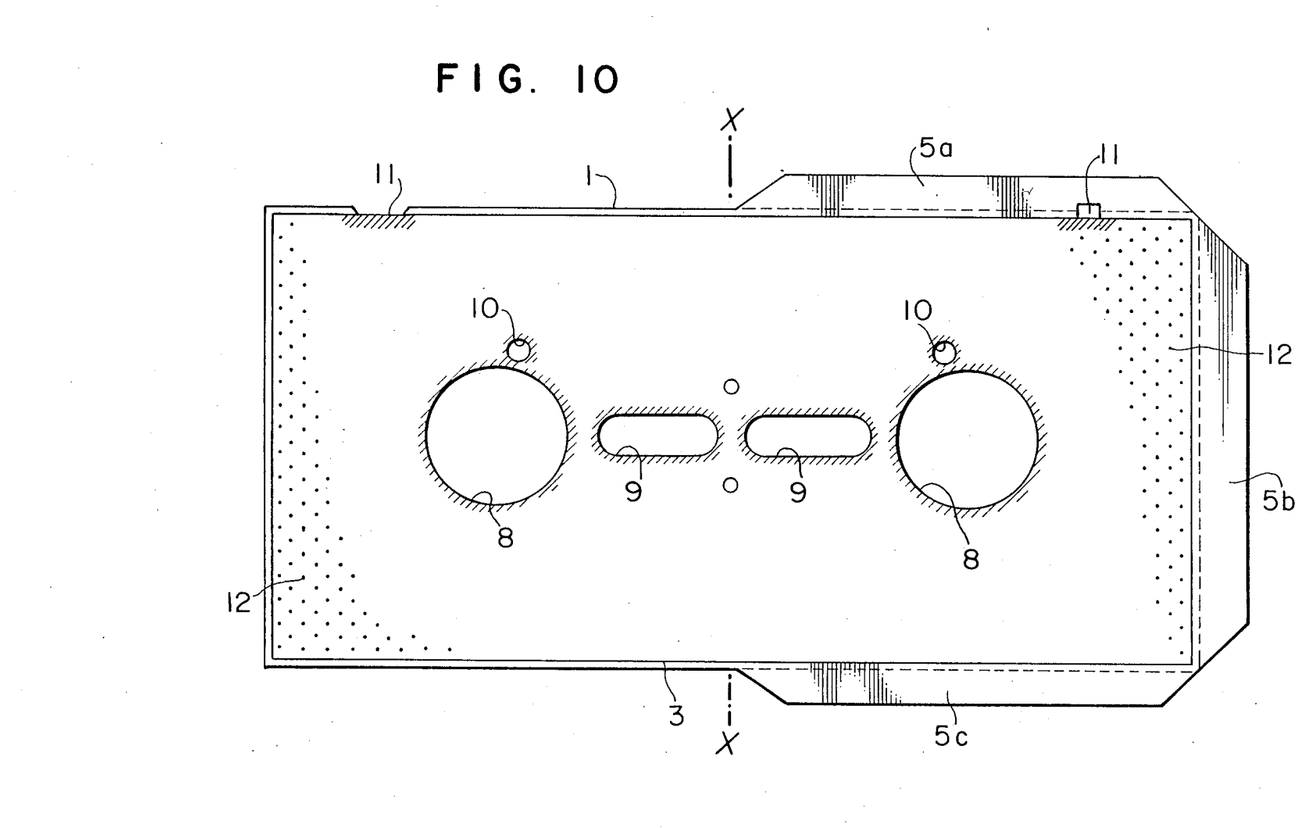
FIG. 10 is a plan view of a conventional disk cartridge in development state.

The welding is conducted at a multiplicity of spots which are denoted by 12 in FIG. 10. After the completion of fixing of the cleaning sheet 3 to the inner surface of the cartridge case 1, a punching is conducted to form various openings or apertures such as a driving hole 8, a head opening 9 and a detection hole 10, as well as a notch 11. Then, the cartridge case which is still in the development state, is folded along an imaginary line X-X such that two opposing panels are formed and then the envelope flaps 5a and 5c are folded to overlie the opposite panel. Then, the flaps 5a and 5c are fixed by, for example, ultrasonic welding as shown in FIG. 9, thereby forming a sack-like disk cartridge. Meanwhile, the magnetic disk 2 is punched out from a green sheet and is inserted into the sack-like disk cartridge. Subsequently, the remaining flap 5b is folded to lie on the opposing panel and fixed by welding thereto, thus completing the disk cartridge.

This known disk cartridge, however, suffers from the following disadvantage in regard to the fixing of the cleaning sheet and there is an increasing demand for a method for eliminating such a disadvantage.

Figure 12:
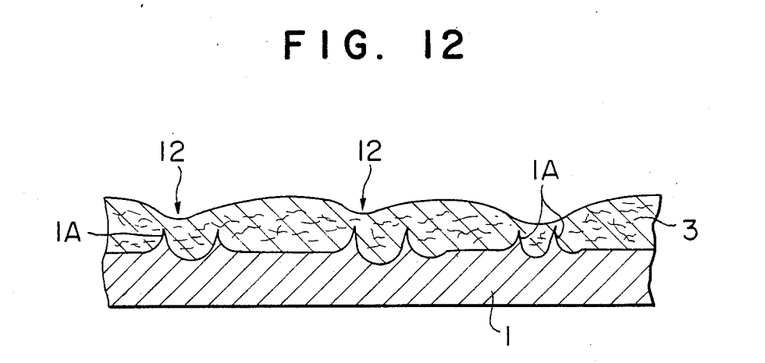
FIG. 12 is a sectional view of a conventional cartridge case illustrating the state of the cleaning sheet spotwelded to the cartridge case.

As a result of the spot welding, the cleaning sheet and the cartridge case are molten at the same time at a multiplicity of spots so as to be fixed together. When the pin 15 is raised after the welding, the molten material of the cartridge case is inevitably raised to form keen edges or burrs 1A which project towards the cleaning sheet 3 as shown in FIG. 12. Obviously, the formation of such burrs 1A is not preferred from the view point of protection of the disk, considering that the disk rotates in contact with the cleaning sheet.

Figure 13:
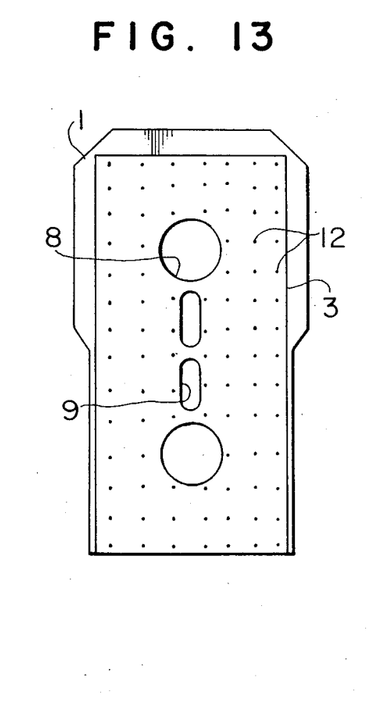
FIGS. 13 to 15 are plan views of cartridge cases in the development state, illustrating known methods of welding a cleaning sheet to a cartridge case.
Figure 14:
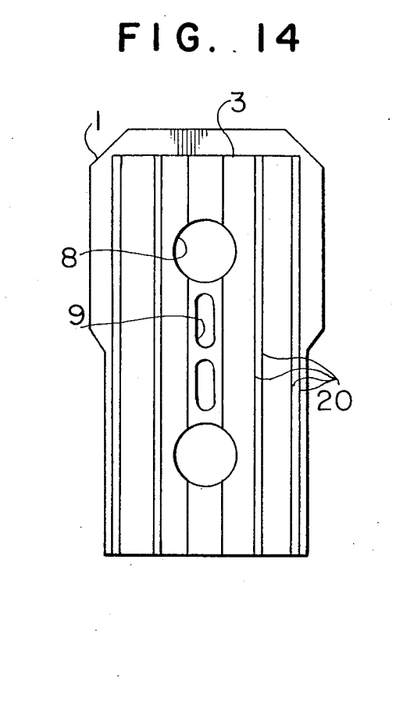

In a conventional general method of producing a disk cartridge, welding spots 12 are uniformly distributed over the entire area of the disk cartridge 1 during the developed state as shown in FIG. 13. In contrast, in another known method as shown in FIG. 14, the welding is conducted along a plurality of parallel lines 20 so as to reduce the number of welding burrs or welding portions, thereby ensuring smooth rotation of the disk received in the disk cartridge.

Figure 15:
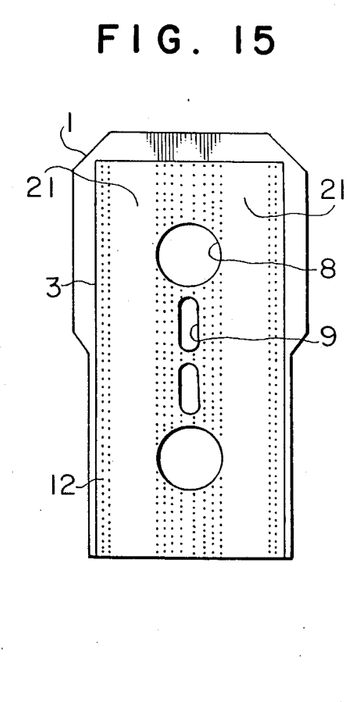

FIG. 15 shows a still another known method in which there are provided belt-like zones in which the welding spots are distributed in a high density and zones in which there is no welding spot. This arrangement also reduces the area of contact between the disk and the welding burrs or welding portions, thus ensuring a smooth rotation of the disk.

Another problem encountered with the known disk cartridge is that the disk in the disk cartridge tends to be damaged by an external force which is applied to the disk cartridge by a pressing member or a pad which is incorporated in the recording/reproducing apparatus on which the disk cartridge is used.

This problem will be explained in more detail. The magnetic disk 2 in the disk cartridge is thin and is made from a material which is highly flexible. Therefore, when the magnetic disk 2 is driven for the purpose of recording or reproduction, it is a common measure to pinch the disk by pressing the cartridge case from both sides thereof in the regions A and B (see FIG. 9) which are on both sides of the head access opening 9 by means of pads which are provided on the recording and reproducing apparatus, thereby avoiding any error which may otherwise be caused by fluttering of the magnetic disk 2 in the disk cartridge case 1. The pressure applied by the pads increases the possibility for the magnetic disk to contact the welding burrs 1A directly or indirectly through the cleaning sheet, the thickness of which has been reduced at the welding spot. In consequence, problems are caused such as damaging of the disk surfaces resulting in the recording and reproduction are being impaired.

SUMMARY OF THE INVENTION

Accordingly, an object of the present invention is to provide a disk cartridge which is capable of overcoming the above-described problems of the prior art.

To this end, according to the present invention, there is provided a disk cartridge for use on a recording and reproducing apparatus, comprising a disk cartridge casing, a disk encased by the disk cartridge casing and a cleaning sheet fixed to the inner surface of the disk cartridge casing by welding, wherein the density of welding portions of the cleaning sheet to the casing in regions of the cleaning sheet which undergo pressure exerted by pressing members of the recording and reproducing apparatus is lower than that in a region around a driving hole formed in the disk cartridge and adapted for receiving a disk drive shaft.

Thus, in the disk cartridge according to the present invention, the welding of the cleaning sheet to the panel of the disk cartridge case is not conducted at all in the region where pressure is applied to the disk cartridge by the pressing members or pads on the recording and reproducing apparatus or, alternatively, the welding density is reduced in such a region as compared with other regions.

Since no welding spot exists or only very few welding spots exist in the region of the disk cartridge which receives the pressure exerted by the pressing members or pads, the risk for the disk to be damaged by the welding burrs is remarkably reduced thereby providing a safe recording and reproducing operation with the the disk operating without trouble.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
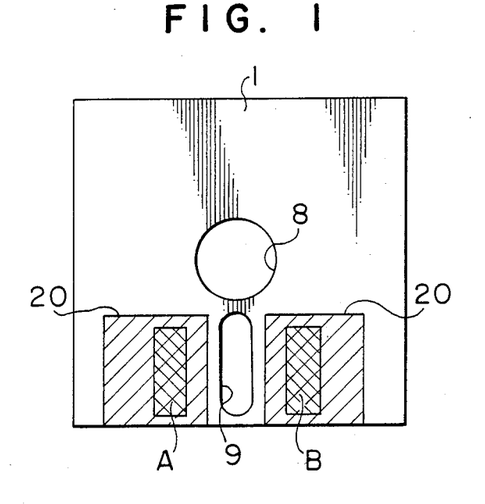
FIG. 1 is a plan view of the disk cartridge in accordance with an embodiment of the present invention.
Figure 2:
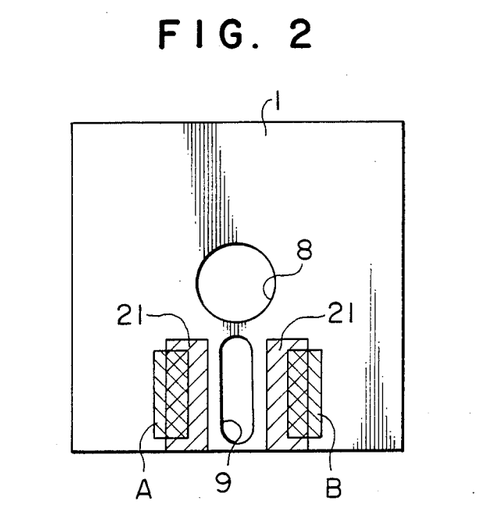
FIG. 2 is a plan view of the disk cartridge in accordance with another embodiment of the present invention.

FIGS. 1 and 2 are plan views of different embodiments of the disk cartridge in accordance with the present invention, illustrating particular regions which are completely devoid of welding spots or which have a reduced density of welding spots as compared with other regions of the disk cartridge. For the purpose of simplification of the description, a term "non-welding region" is used to mean both a region which is completely devoid of the welding spots and a region which has a lower density of welding spots as compared with that in a region around a driving hole 8 formed in the disk cartridge 1.

Figure 3A:
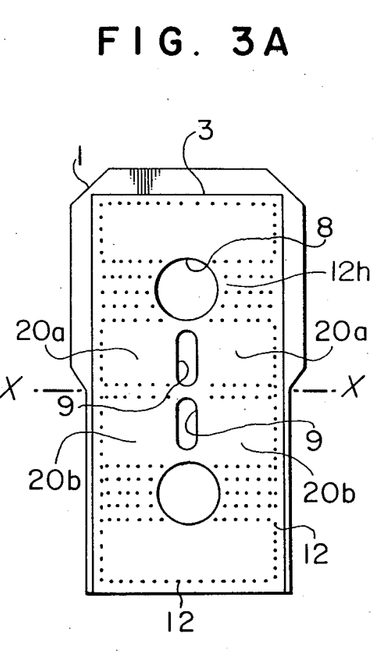
FIGS. 3A to 3C are developed views of cartridge cases showing different patterns of distribution of welding spots.

Referring first to FIG. 1, the disk cartridge has the non-welding regions 20 which are completely devoid of welding spots. These regions 20 are defined such as to wholly cover the portions A and B of the disk cartridge which are on both sides of a head opening 9 and which undergo or are subjected to the pressure exerted by the pressing members or pads. FIG. 3A shows this disk cartridge in the development state. Since the regions 20 have to be provided on both panels of the complete disk cartridge, areas 20a, 20a and areas 20b, 20b, corresponding to the regions 20 and symmetrical with each other with respect to the line X-X of folding, are completely devoid of welding spots. In addition, the welding density at a region 12h around the driving hole 8 is higher than that at the area or region 20a, 22b.

Referring now to FIG. 2 showing another embodiment, non-welding regions 21, 21 have smaller areas than the non-welding regions 20, 20 of the first embodiment shown in FIG. 1, so that the regions 21 only partially overlap the portions A and B which are pressed by the pressing members on the recording and reproducing apparatus. This arrangement is advantageous in that it can avoid any tendency for the cleaning sheet to be moved to affect the recording/reproducing operation due to friction between the cleaning sheet and the disk upon rotation of the disk which may occur when the nonwelding region has a wide area, i.e., when the cleaning sheet has a wide area which has no support, although there is some fear that the disk may be damaged to some extent on account of the arrangement. FIG. 3C further illustrates the disk cartridge in development state. It will be seen that the areas 21a, 21a and 21b, 21b correspond to the non-welding region 21 shown in FIG. 2. The welding density at the region 12h is higher than that at the regions 21a, 21b.

Figure 3B:
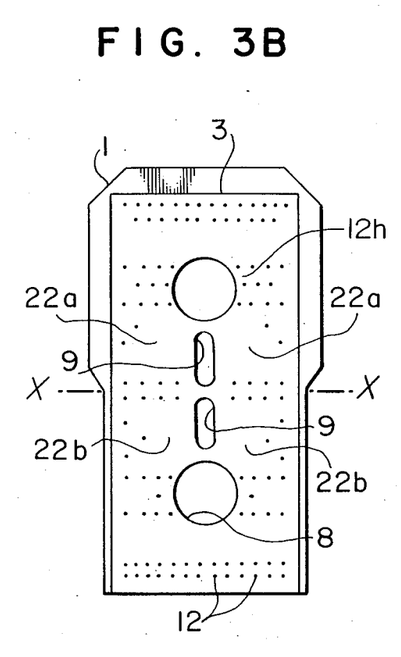
Figure 3C:
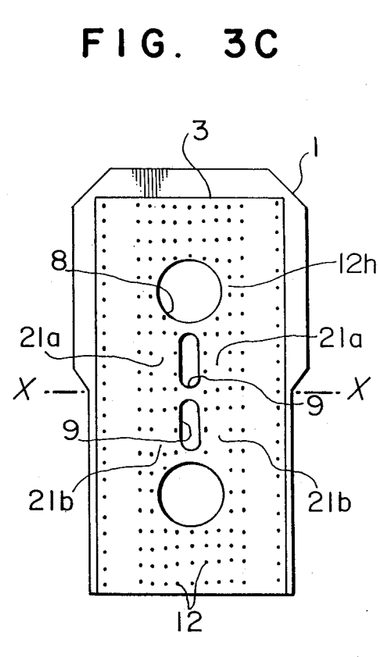

FIG. 3B illustrates a different embodiment in which the welding spots are distributed in a comparatively small density and the density is further reduced specifically in the areas which undergo the pressure exerted by the pressing members or pads on the recording and reproducing apparatus so as to reduce the tendency for the disk to be damaged due to contact between the welding portions or burrs and the disk. Thus, in this embodiment, non-welding regions are provided by the areas 22a, 22a and 22b, 22b which have reduced density of the welding spots. The welding density at the region 12h is higher than that at the regions 21a, 21b.

As in the known disk cartridges, the cleaning sheet may be formed from a non-woven cloth of a fiber mixture composed of rayon fibers and polypropylene fibers, a fiber mixture composed of rayon fibers and polyethylene terephthalate fibers, fibers of polyethylene terephthalate solely, or the like. After the fixing of the cleaning sheet, the known processes including punching of holes and apertures and folding of the sheet and flaps are conducted followed by insertion of the magnetic disk which has been prepared separately, thus completing the disk cartridge.

Thus, in the disk cartridge according to embodiments of the present invention, the fixing of the cleaning sheet by spot welding to the inner surface of the cartridge case is conducted such that there is no welding spot at all or the density of the welding spot is substantially reduced in and around the most regions which undergo the pressure exerted by pressing members of the recording and reproducing apparatus during operation of the apparatus. Therefore, the risk for the disk to be damaged by the welding burrs which tend to be produced as a result of the spot welding is remarkably reduced as compared with the known disk cartridge.

In one aspect of the present invention, the density of welding of the cleaning sheet is reduced at the area of the portion of the cleaning sheet contactable with the disk as compared with other portions of the cleaning disk, and the welding spot density is reduced to zero or, at least, to the same level as that of the disk contact portion, in the regions on both sides of the head access opening which undergo the pressure exerted by the pressing members or pads on the recording and reproducing apparatus.

According to an aspect of the present invention, smooth rotation of the disk is ensured because the number of welding spots, which produce certain levels of resistance to the disk rotation, is reduced in the portion of the cleaning sheet contactable with the disk. In addition, the risk of damages to the disk by welding burrs produced as a result of the spot welding, is remarkably reduced by virtue of the fact that the regions of the cleaning sheet subjected to pressure exerted by the pressing pads of the recording and reproducing apparatus are completely devoid of the welding spots or has only a few welding spots.

Figure 4:
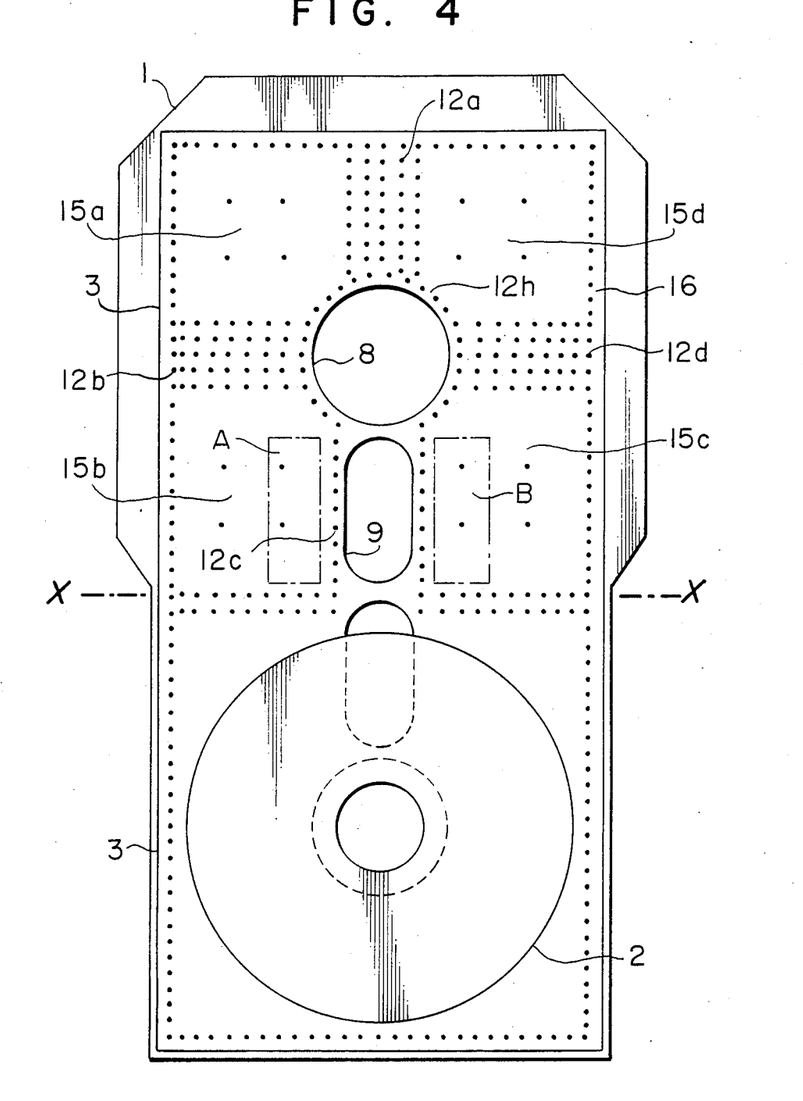
FIG. 4 is a plan view of the disk cartridge according to still another embodiment of the present invention in a development state.

Referring to FIG. 4, there is seen a disk cartridge 1 according to a embodiment of the invention in the development state. A cleaning sheet 3 is fixed to the inner surface of the disk cartridge 1 by welding at a multiplicity of welding spots which are concentrated in predetermined regions of the cleaning sheet 3. Since two halves of the disk cartridge 1 on both sides of the line of folding X—X have constructions which are substantially the same, the description will be made with respect to only the half which is shown on the upper side of the folding line X—X, as viewed in FIG. 4. As will be seen from this Figure, spot welding regions or 3 zones 12a, 12b, 12c and 12d each having a multiplicity of welding spots, are formed substantially in a cross-shape around the driving hole 8. The welding region 12c around the head access opening 9 has only one row of welding spots on each side of the head opening 9. Thus, the regions of the cleaning sheet corresponding to the portions A and B of the disk cartridge adapted to be pressed by the pressing members or pads of the recording and reproducing apparatus are materially devoid of substantial welding spots. More specifically, in the arrangement shown in FIG. 4, each of the regions of the cleaning sheet under the portions A and B adapted to be pressed by the pressing members or pads of the recording and reproducing apparatus has only two welding spots.

As a result of the cross-shaped arrangement of the welding regions 12a to 12d, low welding density zones or regions 15a, 15b, 15c and 15d are formed near four corners of the panel of the cartridge case. Peripheral high density welding zone or regions 16 are also formed along four edges of the cleaning sheet 3. The other half of the cartridge case 1, which is shown on the lower side of the folding line X—X, has a spot welding pattern substantially the same as that of the half shown at the upper side of the folding line X—X. According to this arrangement, since the low welding density zones of the cleaning disk having a reduced density of welding spots in contact the disk in the disk cartridge, the resistance encountered with the disk during rotation is reduced to ensure smooth rotation of the disk. In addition, since the low welding density zones 15a to 15d having substantially the same configuration and welding spot density with each other are arranged at an equal angular pitch or interval in the direction of rotation of the disk, the load applied to the disk during rotation thereof is substantially balanced to ensure smooth and uniform rotation without causing undulation and fluttering of the magnetic disk. Moreover, since the number of welding spots is reduced in the regions corresponding to the portions A and B pressed by the pressing pads, the risk for the disk to be damaged due to direct or indirect contact with the welding burrs is remarkably suppressed.

Furthermore, the welding density at the region 12h around the hole 8 is higher than that at the region 15b, 15c.

Figure 5A:
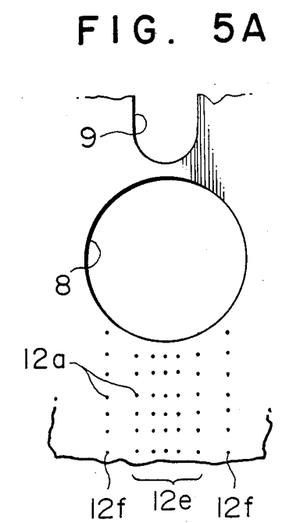
FIGS. 5A and 5B are fragmentary plan views of disk cartridges showing different patterns of distribution of the welding spots in a high welding density region.
Figure 5B:
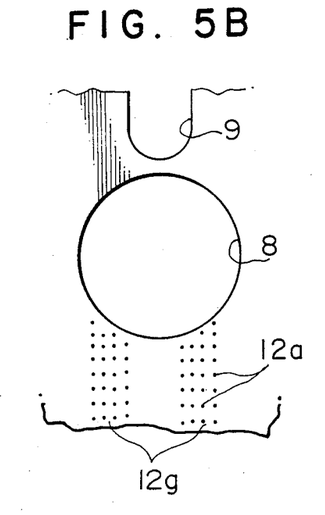

FIGS. 5A and 5B show modifications of the embodiment shown in FIG. 4. In the modification shown in FIG. 5A, each of the welding zones 12a to 12d which are arranged in a cross-like shape includes a central dense portion 12e where the welding spots are arranged at a high density and a single row of welding spots 12f which is on each side of the central dense portion, in contrast to the embodiment shown in FIG. 4 in which the welding spots are uniformly dispersed in each of the welding zones 12a to 12d. In the modification shown in FIG. 5B, each of the welding zones 12a to 12d includes two parallel high welding density portions 12g, 12g which have a high density of welding spots and which are arranged in parallel with each other.

Figure 6:
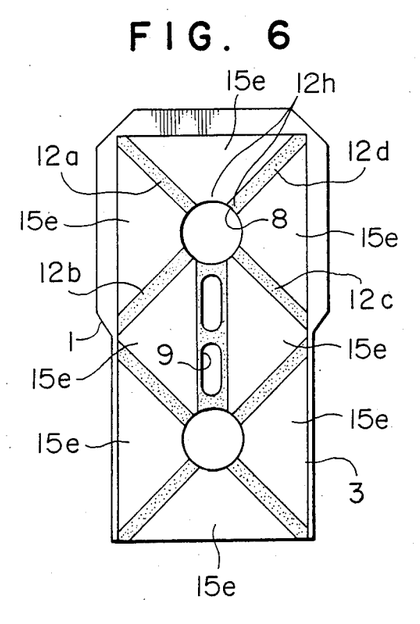
FIG. 6 is a plan view of a disk cartridge in development state, showing another example of a welding spot distribution pattern in a high welding density region.

FIG. 6 shows another modification in which the high welding density zones 12a to 12d are formed along diagonal lines of each half of the disk cartridge case in the development state thereof so that substantially triangular low welding density zones 15e are formed. It will be clear to those skilled in the art that the arrangement shown in FIG. 6 offers the same advantage as that derived from the embodiment shown in FIG. 4. In this case, it is also true that the welding density averaged over a circular region 12h around the hole 8 is higher than that at the region 15e near the hole 9 where the pressing force is applied.

Figure 7:
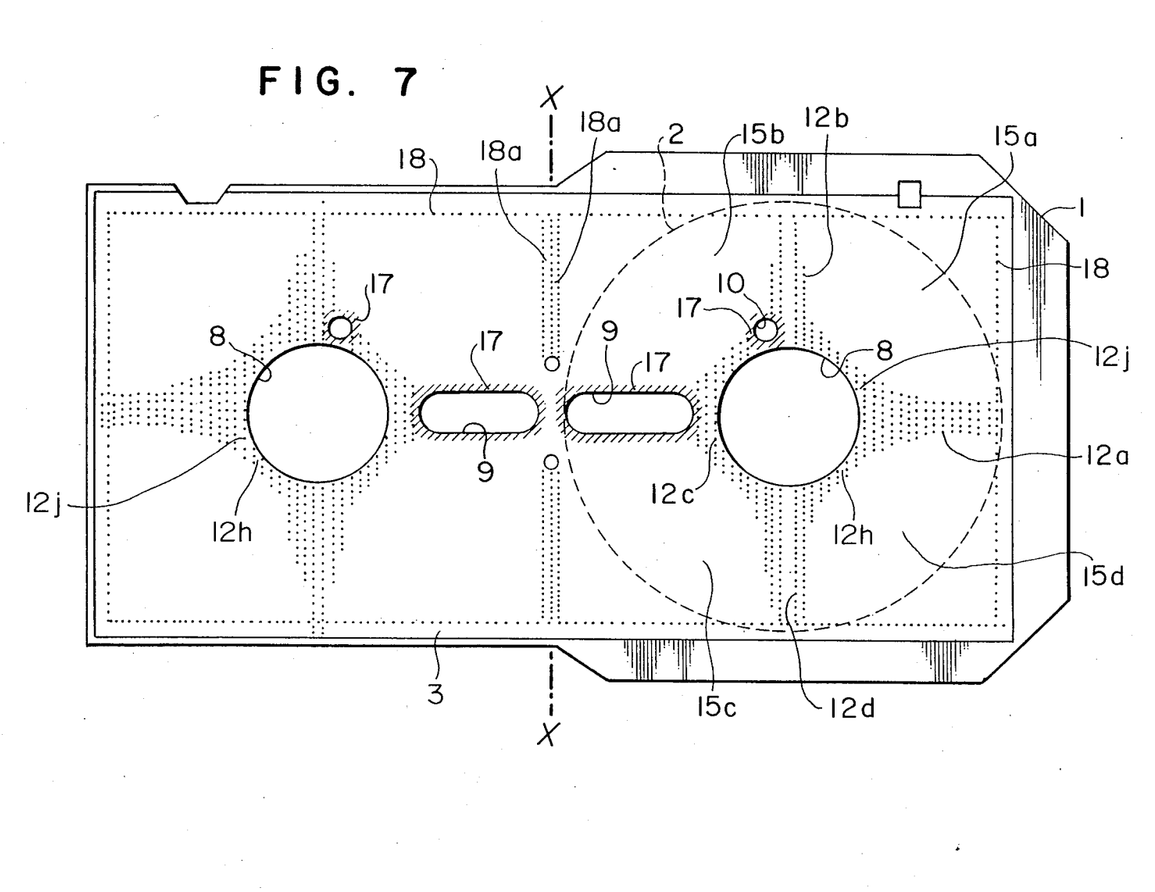
FIG. 7 is a plan view of the disk cartridge, in the developed state, according to a different embodiment of the present invention.

FIG. 7 shows a different embodiment which also has four high welding density zones 12a, 12b, 12c and 12d. In this embodiment, however, the welding spots belonging to the high welding density zones are arranged in arcuate patterns to be a circular pattern 12j as a whole at the central portion of the cross, i.e., in the portion 12h around the driving hole 8. With this arrangement, it is possible to securely fix the cleaning sheet 3 to the inner surface of the disk cartridge particularly at the region around the driving hole 8, thereby suppressing any tendency for the cleaning sheet 3 to deviate or flutter when the disk is being operated on a recording and reproducing apparatus. The described pattern of the high welding density regions provide substantially sector-shaped low welding density zones 15a, 15b, 15c and 15d. In this embodiment, the cleaning sheet 3 is fixed to the disk cartridge case at the region around the head opening 9 by other means than spot welding, e.g., by bonding or an areal welding such as slanting parallel welding lines (hatched form) as denoted by numeral 17 in FIG. 7, thereby preventing the fibers of the cleaning sheet from coming off in the region around the head opening 9 during the use of the disk cartridge 1. The bonding or areal welding region is also provided around the detection hole 10.

Furthermore, high welding density region 18 having high welding spot density is formed on either side of the imaginary line X—X along the peripery thereof including regions 18a along the line X—X so as to avoid fluttering of the cleaning sheet in the region around the head insertion or access opening 9 at the completion of the disk cartridge.

Figure 8:
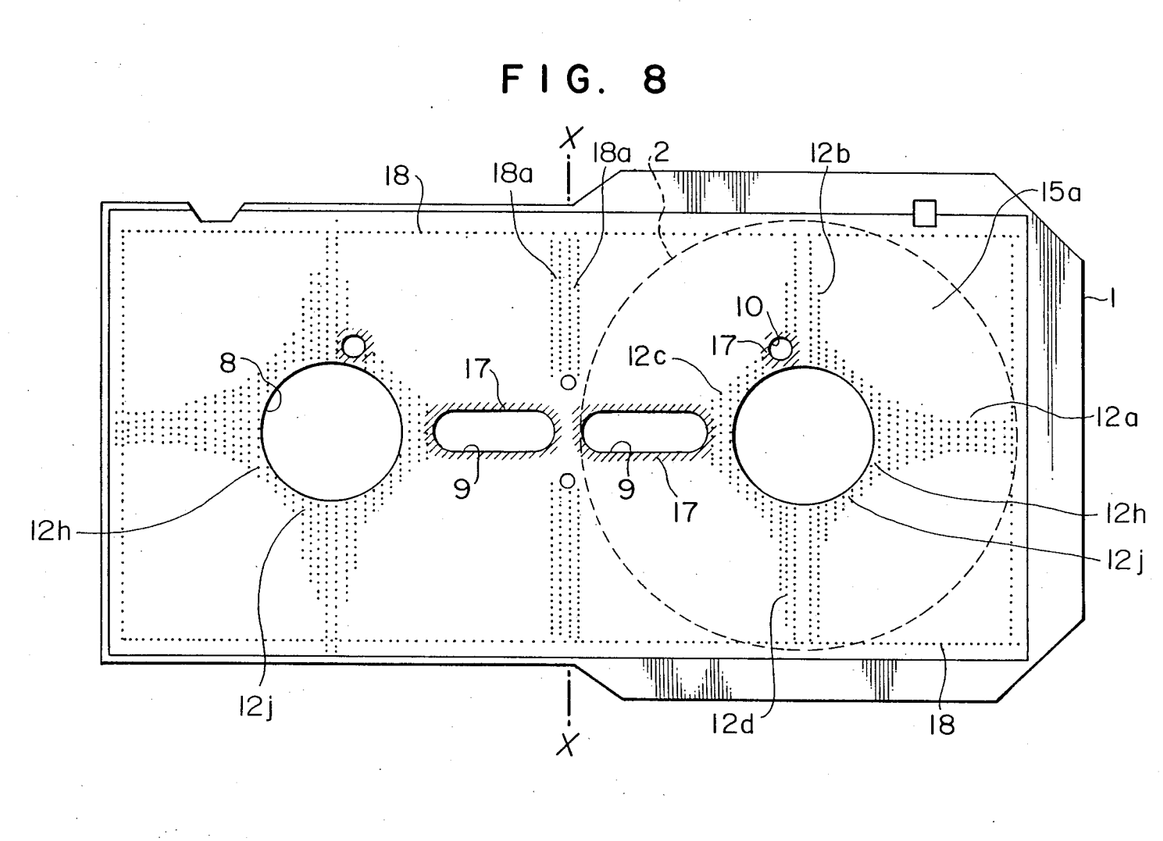
FIG. 8 is a plan view of a developed disk cartridge which is a modification of the disk cartridge shown in FIG. 7.

FIG. 8 shows a modification of the embodiment shown in FIG. 7. In this modification, the high welding density zones 18a on both sides of the imaginary lines X—X are provided over a greater area than in the arrangement shown in FIG. 7.

As in the known disk cartridges, the cleaning sheet 3 may be formed from a non-woven cloth of a fiber mixture composed of rayon fibers and polypropylene fibers, a fiber mixture composed of rayon fibers and polyethylene terephthalate, fibers of polyethylene terephthalate solely, or the like. After the fixing of the cleaning sheet, the known processes including punching of holes and apertures and folding of the sheet and flaps are conducted followed by insertion of the magnetic disk which has been prepared separately, thus completing the disk cartridge.

As has been described, according to the invention, the number of the welding spots for fixing the cleaning sheet to the disk cartridge case is reduced in the portions of the cleaning sheet contactable with the portion of the disk mounted in the disk cartridge. In consequence, the resistance to rotation of the disk produced by the welding spots is reduced to ensure a smooth rotation of the disk as compared with the conventional disk cartridge.

Furthermore, the welding density, i.e., the density of the welding spots or lines, is reduced in the regions around the portions which receive the pressure exerted by the pressing members or pads on the apparatus during the operation, so that the risk for the disk to be damaged due to direct or indirect contact with the welding burrs, which tends to be experienced due to pressing of the disk between the cleaning sheets, can be remarkably suppressed.

Although the invention has been described through specific forms, it is to be understood that the described embodiments and modifications are only illustrative and various changes and modifications may be imparted thereto without departing from the scope of the invention which is limited solely by the appended claims.

What is claimed is:

1. A disk cartridge for use in a recording and reproducing apparatus, comprising a disk cartridge casing including driving holes formed therein adapted to receive a disk drive shaft, a disk encased by said disk cartridge casing head access opening and a cleaning sheet welded to an inner surface of said disk cartridge casing, wherein the density of welding sites of said cleaning sheet to said casing in regions where said cleaning sheet undergoes pressure exerted by pressing members of said recording and reproducing apparatus is lower than higher density sites in regions or zones around said driving holes formed in said disk cartridge, said zones of high welding density being formed so as to extend from an outer circumference of said driving holes to a periphery of said disk cartridge casing in a first direction perpendicular to a second direction along which an imaginary line connects said driving hole to said head access opening.

2. A disk cartridge according to claim 1, wherein said cleaning sheet is fixed by a multiplicity of slanting parallel welding lines to said disk cartridge case in a region around said head access opening formed in said disk cartridge case and adapted for receiving a magnetic head of said recording and reproducing apparatus.

3. A disk cartridge according to claim 1, wherein said cleaning sheet is formed of a non-woven cloth of synthetic fibers.

4. A disk cartridge according to claim 1, wherein said referenced lower density welding sites are completely devoid of welding spots.

5. A disk cartridge for use in a recording and reproducing apparatus, comprising a disk cartridge casing including driving holes formed therein, a disk encased by said disk cartridge casing, head access opening and a cleaning sheet welded to an inner surface of said disk cartridge casing, wherein the density of welding sites of said cleaning sheet to said casing in regions or zones where said cleaning sheet undergoes pressure exerted by pressing members of said recording and reproducing apparatus is lower than higher density sites in regions or zones around said driving holes formed in said disk cartridge and adapted for receiving a disk drive shaft, said zones of high welding density sites being formed in a crossing pattern around said driving holes with said driving holes serving as crossing points such that said zones of low welding density sites are formed between adjacent zones of high density welding sites.

6. A disk cartridge according to claim 5, wherein said cleaning sheet is further fixed to said disk cartridge casing by a multiplicity of slanting parallel welding lines in a region around said head access opening formed in said disk cartridge case and adapted for receiving a magnetic head of said recording and reproducing apparatus.

* * * * *